US006559883B1

(12) United States Patent
Fancher et al.

(10) Patent No.: US 6,559,883 B1
(45) Date of Patent: May 6, 2003

(54) MOVIE FILM SECURITY SYSTEM UTILIZING INFRARED PATTERNS

(75) Inventors: James A. Fancher, Mar Vista, CA (US); David H. Sitrick, 820 Burchell, Highland Park, IL (US) 60035; Gregory P. Sitrick, Highland Park, IL (US)

(73) Assignee: David H. Sitrick, Highland Park, IL (US)

( * ) Notice: Subject to any disclaimer, the term of this patent is extended or adjusted under 35 U.S.C. 154(b) by 330 days.

(21) Appl. No.: 09/671,007

(22) Filed: Sep. 27, 2000

(51) Int. Cl.[7] ................................................. H04N 5/33
(52) U.S. Cl. .................................................... 348/164
(58) Field of Search ..................... 348/164; H04N 7/18

(56) References Cited

U.S. PATENT DOCUMENTS 5,503,904 A * 4/1996 Yoshinaga et al. .......... 428/195
6,153,879 A * 11/2000 Yoshinaga et al. .......... 250/271
6,198,503 B1 * 3/2001 Weinreich ................... 348/164

* cited by examiner

*Primary Examiner*—Howard Britton
(74) *Attorney, Agent, or Firm*—Sitrick & Sitrick

(57) ABSTRACT

A security method and system for protecting movie film images from being recorded by video cameras. The system is comprised of a means to generate an infrared pattern and a means to display this infrared pattern. The infrared pattern generated and displayed is of sufficient strength such that video cameras with infrared filters can not prevent the infrared pattern from interfering with the recording. A human viewing a screen containing movie film images sees only the movie film images on the screen and does not see the infrared pattern being displayed simultaneously. Video cameras aimed to record a screen containing the movie film images, even video cameras having infrared filters, are unable to prevent the infrared pattern from interfering with recording the movie film images, and one embodiment may completely obscure the picture being recorded and render it unacceptable for even pirated distribution.

41 Claims, 12 Drawing Sheets

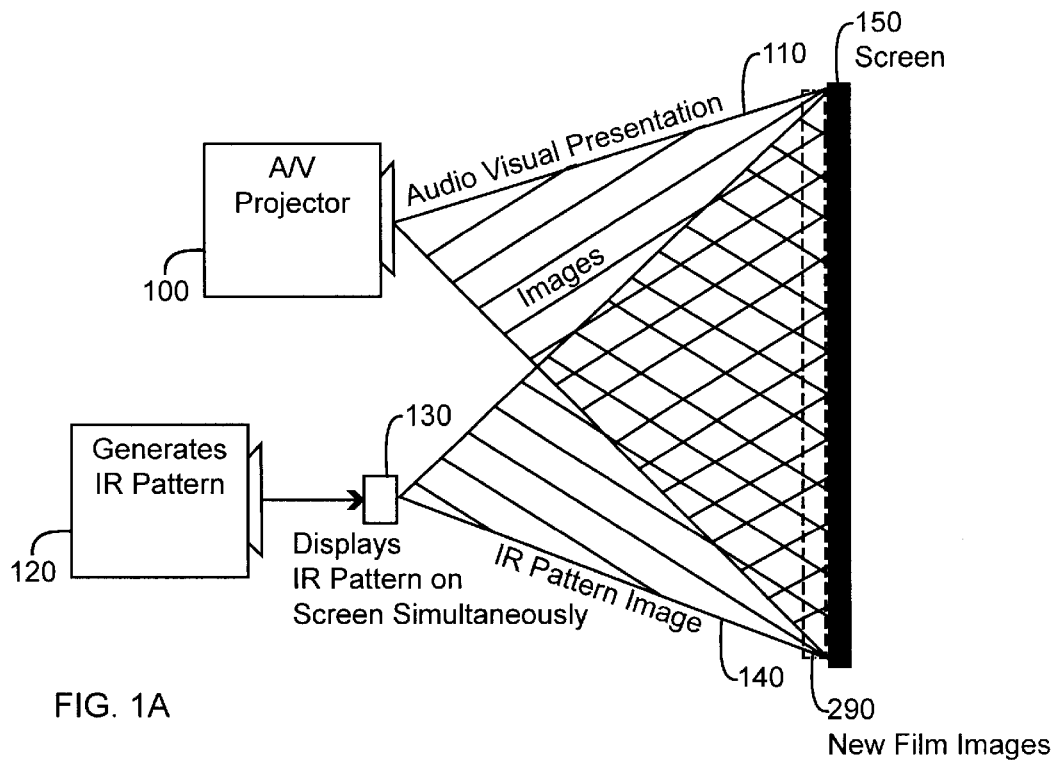
FIG. 1A
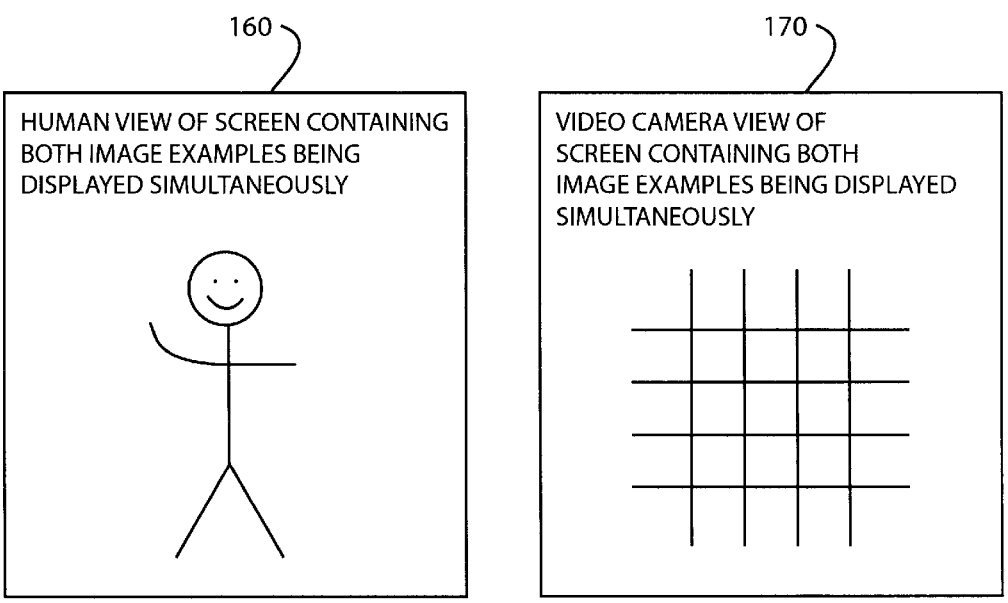
FIG. 1B
FIG. 1C

MOVIE FILM SECURITY SYSTEM UTILIZING INFRARED PATTERNS

RELATED APPLICATIONS

Not Applicable.

FEDERALLY SPONSORED RESEARCH OR DEVELOPMENT

Not Applicable.

BACKGROUND OF THE INVENTION

This invention relates to protecting movie films from being illegally duplicated, and more specifically, relates to protecting movie films from being duplicated via video camera recordings during the showing of the film.

Currently, there are video camera recordings being made and sold illegally all over the world. The people who make these recordings (referred to hereafter as pirates) do so by attending new or recently released films at the movie theater with a video camera. These pirates record the film's presentation from the start and continue for the duration of the movie. The pirates then take the recording and make duplicate copies. These copies are then sold illegally, and end up costing the movie industry, and the investors for the specific movie films, billions of dollars.

The film industry is aware of this problem and have asked movie theaters to help in the enforcement against the pirated recordings of new and recently released movie films. The movie theaters currently use two security measures against pirates. The first security measure is to check all larger handbags for video cameras. The problem with this measure is that it leaves the ticket collector at the movie theater with the responsibility of using his or her own discretion to decide what defines a large handbag as opposed to just a big handbag. The other flaw in this measure is that with the current technologies, video cameras are currently made small enough to fit in a pant or jacket pocket. Therefore, this measure is highly ineffective against stopping pirates from getting video cameras into the movie theater.

The second security measure used is an usher. Periodically throughout the film presentation, an usher will walk through the aisles in the theater, looking for pirates. The flaw in this security measure is that since the theater is very dark during the showing of a film, the usher cannot always see well enough to identify a pirate making a recording, especially in some of the larger theaters where there are hundreds of people sitting close to one another.

The problem then still exists of preventing these pirates from making video camera recordings of new or recently released films. Both the movie theaters and the movie film industry are being greatly affected financially by the pirates and their sale of illegal copies of movie films. The past and current attempts to stop pirates from making illegal recordings have not been successful. The best current solutions can only detour pirates, and focus on preventing a pirate from getting a camera into the theater or on locating the pirate once he has begun recording. No current security measures exist that prevent a video camera from physically recording the film image being displayed on a screen.

It is therefore an object of the present invention to provide a solution to the pirated recording problem, unlike any other current solution, by focusing on the movie film and video camera relationship, rather than the pirate and movie theater relationship, in the form of a security method and system for motion picture display (or other light image) against being recorded by video cameras.

SUMMARY OF THE INVENTION

The present invention encompasses a movie film security system displaying infrared pattern images along with movie film images such that a person viewing a screen containing the movie film images sees only the movie film images and is not able to see the infrared pattern being displayed, while a video camera aimed at the screen containing the movie film images is interfered with (made commercially unusable) in the recording of the movie image because the infrared filter in the video camera is sensitive to the infrared pattern image which interferes with the recording of the movie film images by the video camera.

In accordance with one aspect of the present invention, an infrared pattern is generated of sufficient strength that exceeds the infrared exposure limits on any targeted video camera's infrared filter, or for all video cameras. When a video camera is aimed at a screen to record the movie images, it also records the infrared pattern of such strength that the video camera is unable to filter the infrared pattern image from interfering with recording.

In accordance with one embodiment of the present invention, the infrared pattern image of such strength is superimposed with audiovisual presentation images (e.g., movie film images) to create new film images which obscure or create a pattern which is recorded by pirate video cameras.

Multiple "strength" options exist. In accordance with one embodiment of the present invention, a first strength level is provided that is of sufficient strength such that the video camera recording of the new film images is totally obscured.

In other words, the strength of the infrared pattern exceeds the limits of the video camera's infrared filter and completely obscures the recording of the audiovisual presentation images.

In accordance with another embodiment of the present invention, a second strength level of infrared is provided that is of sufficient strength such that the video camera recording of the new film images is interfered with and contains both the movie film images with a visible overlay of the superimposed infrared pattern being recorded as displayed simultaneously.

There are also many options as to the generation of the blocking infrared pattern. In one embodiment, a combined projector generates an infrared pattern and superimposes the infrared pattern with audiovisual presentation images (e.g., the projected movie) to display a combined film and infrared pattern image onto a screen. Alternatively, using two projectors, a first audiovisual presentation projector provides for displaying audiovisual presentation images onto a screen, and a second infrared projector provides for displaying an infrared pattern image simultaneously onto the screen, to create new film images containing the superimposed audiovisual presentation images and the infrared pattern images. Infrared light sources can be floodlights, lasers, and other.

The strength levels needed to bleed, saturate, or override the video camera's infrared filters can be best set empirically by testing in the venue or theaters or by projection equipment and screen calibrations, etc. Publicly available information details infrared filter characteristics.

Various patterns of infrared can be used. Some interfere with recording (such as cross-hatch, grid cross, stipling, etc.), while others completely obscure recording (such as luminance inversion, or completely overpowering visible light projection).

In accordance with an alternative embodiment of the present invention, a means to generate infrared patterns provides for interference with unauthorized video camera recordings, by displaying the infrared pattern to the human audience in a seating area, without having to superimpose the images.

In accordance with another alternative embodiment of the present invention, a means to generate an infrared pattern provides for interference with unauthorized video camera recording, by displaying an infrared pattern in front of the screen containing the movie film images without displaying the infrared pattern to the human audience seating area, without having to superimpose the images.

These and other aspects and attributes of the present invention will be discussed with reference to the following drawings and accompanying specification.

BRIEF DESCRIPTION OF THE DRAWINGS

FIG. 1A illustrates a general block diagram of one embodiment of an overall movie film security system, in accordance with the present invention;

FIG. 1B illustrates an example of an audiovisual presentation image;

FIG. 1C illustrates an example of an infrared pattern image;

DETAILED DESCRIPTION OF THE PREFERRED EMBODIMENT

Figure 1E:
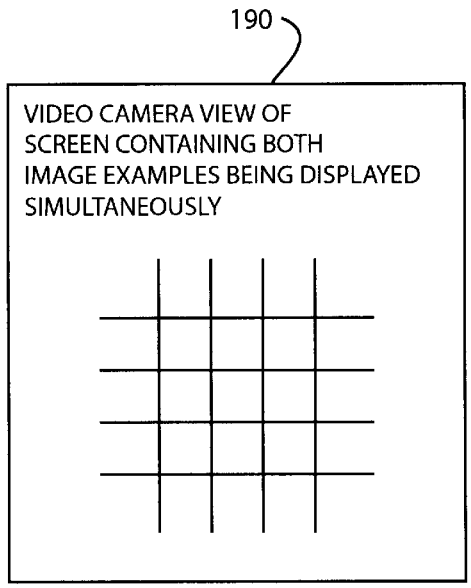
FIG. 1E illustrates one embodiment of what a video camera sees and records when aimed at a screen containing both the infrared pattern image example and the audiovisual image example being displayed simultaneously.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIG. 1A illustrates one specific embodiment of the present invention. Referring to FIG. 1A, an audiovisual presentation projector 100 provides for displaying audiovisual presentation images 110 onto a screen 150, while an infrared (IR) pattern image 140 is being displayed on the screen 150 simultaneously from the same or a separate infrared light projector as discussed elsewhere herein. Movie theater audiovisual projectors are available from Barco, Philips, IMAX, Christie, Sony, Panasonic, Electohome, and others, and are currently used for displaying audiovisual presentation images onto screens. Various projection and display technologies are available, such as laser, light valve, light amplifiers, bulb light projectors, and digital light projectors. As illustrated, the IR pattern image 140 is generated via an IR pattern generator 120 and projected and displayed on the screen 150 via an apparatus 130, such as a projector. Various types of infrared generators are commercially available capable of generating IR patterns.

In accordance with one aspect of the present invention, the audiovisual presentation images 110 and the IR pattern image 140 superimpose to create new combined images (film and pattern) 290 whereby a human audience viewing the new combined images 290 on the screen 150. Existing screens in existing theaters can be utilized with some embodiments of the present invention (i.e., infrared reflective), while new screens could be specially built to be utilized with other disclosed embodiments (e.g., reflective, and transmissive). The audience will see only the audiovisual presentation images 110 within the new film images 290, and will not be able to see the IR pattern image 140, whereas a video camera will not properly record the audiovisual presentation images 110 with the resultant recording being either interfered with by the IR pattern image 140, or totally blocked so as to record just the IR pattern image 140 and none of the audiovisual presentation images 110.

All video cameras have a field of view for recording. The video camera's field of view is narrow and when aimed at the screen, picks up primarily light from the area of the screen.

Currently available video cameras such as Sony, Canon, Panasonic, Hitachi, Ihregami (and ranging from VHS, 8 mm, DV, mini-DV, etc.) employ IR filters for filtering during recording. All video cameras currently being sold have IR filters.

Existing screens, in existing theaters, can be utilized with some embodiments of the present invention (e.g., infrared reflective), while new screens could be specially built to be utilized with disclosed embodiments (e.g., reflective, and transmissive).

As described above, FIG. 1A illustrates one embodiment for protecting movie film images projected onto a screen from being filmed using a video camera, comprising generating an visual presentation image (i.e., projected motion picture) on a screen via a projector while generating an infrared (IR) pattern and displaying the infrared pattern on the screen as an IR pattern image while simultaneously displaying the visual presentation image to create a combined new film image on the screen in such a way that the IR pattern image does not interfere with a human audience viewing of the visual presentation image on the screen, yet a video camera aimed at the screen records the IR pattern image being displayed on the screen.

FIGS. 1B through 1E illustrate views of the screen in accordance with how the embodiment of FIG. 1A would function.

FIG. 1B illustrates the audience view of an audiovisual presentation image 160, such as from an electronic (e.g., digital light projector) or conventional motion picture projector.

FIG. 1C illustrates the video camera view of an IR pattern image 170. The present invention is compatible with any light projected imaging, such as film projectors, digital light projectors, where the two images (visual and infrared) are displayed simultaneously on a screen, superimposing the audiovisual presentation images with the IR pattern image to create a set of new images comprised of both the audiovisual presentation images and the IR pattern image.

Figure 1D:
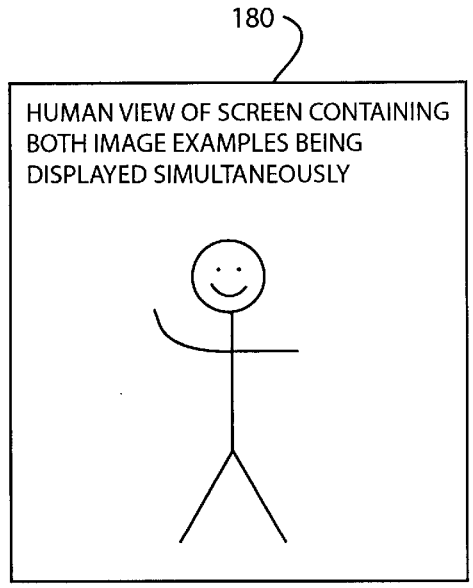
FIG. 1D illustrates a view of what a human would see looking at a screen containing both the infrared pattern image and the audiovisual image being displayed to the human audience.

FIG. 1D illustrates a view 180 of what a human would see on the screen 150 when both the audiovisual presentation image example 160 and the IR pattern example 170 are being superimposed and displayed simultaneously on the screen 150.

FIG. 1E illustrates one embodiment of what a video camera would record 190 if the video camera was pointed at the screen 150 containing the superimposed IR pattern image example 170 and the audiovisual presentation image example 160 being displayed simultaneously.

FIG. 1E illustrates that the video camera records only the IR pattern example 170. Recording of the visual presentation image example 160 is interfered with (totally or partially). One case interferes with recording of the movie, whereas the second case completely obscures the recording of the movie.

FIGS. 1A–1E illustrate the system and methodology by which an IR pattern image 140 can be used as a security measure against video camera recording by someone in the audience of the showing of a movie film. FIG. 1E illustrates the resulting outcome of the recording as a result of the security system illustrated in FIGS. 1A–1D.

Figure 2:
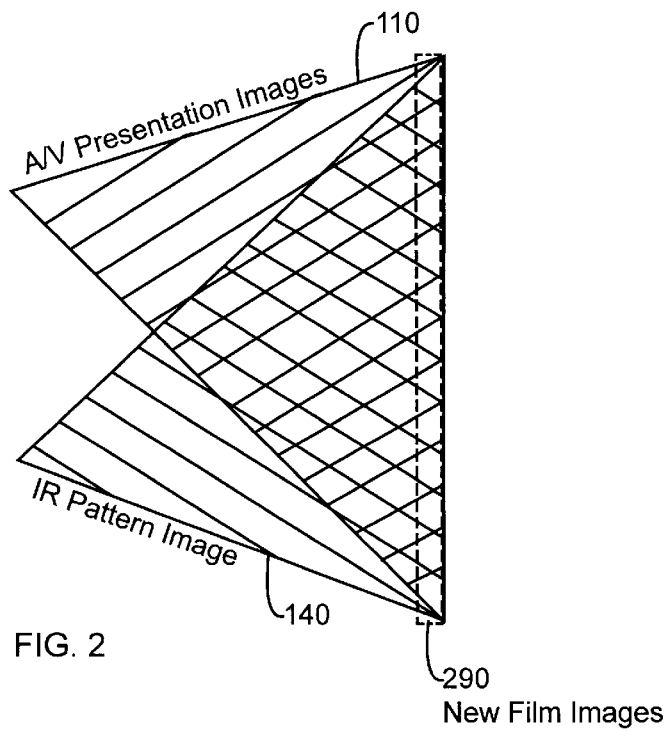
FIG. 2 illustrates audiovisual presentation images being superimposed with an infrared pattern image to create new combined film and infrared images.

Referring to FIG. 2, audiovisual presentation images 110 are superimposed with an IR pattern image 140 to create a set of new combined film and pattern images 290. These new film images 290 are the images displayed on a screen 150 and still provide for unaffected viewing of the audiovisual presentation images by a human audience, while providing the IR pattern image 140 to interfere with the recording of the new film images 290 by a video camera. The human audience viewing of the audiovisual presentation images 110 is unaffected, even though the IR pattern image 140 is also present in the new film images 290. As described above, FIG. 2 represents one embodiment of the present invention illustrating superimposing the audiovisual presentation images with the IR pattern image to create a set of new film images comprised of both the audiovisual presentation images and the IR pattern image.

Figure 3:
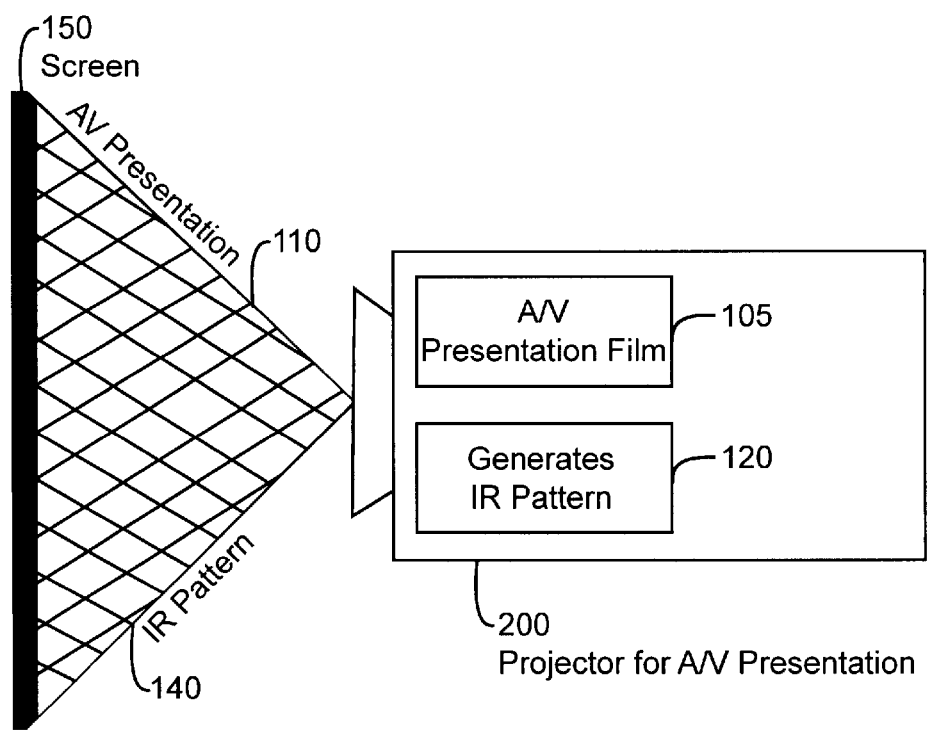
FIG. 3 illustrates a block diagram of an audiovisual presentation projector capable of generating an infrared pattern.

FIG. 3 illustrates a projector 200 providing for projection of an audiovisual presentation film 105 and also providing for the projection of an IR pattern 120. Use of Metadata track (synchronous track) with an inverted image playing back to the infrared projector is played back in sync with the original projected image to obscure the original image 110 and creates an infrared negative 120 of original projected image 110, to totally obscure the recording to all white. The Metadata track can be used to trigger changes in the IR pattern. The combination projection is of the audiovisual presentation images 110 (those created from the audiovisual presentation film 105) and the infrared pattern 120 on to a screen 150. An IR pattern generator is commercially available such as by using an infrared light in an existing light show modulator (such as is available from Radio Shack, Edmund Scientific, and others). FIG. 3 illustrates the combined generation within a single projector subsystem of the audiovisual presentation image and the IR pattern on the screen.

Figure 4:
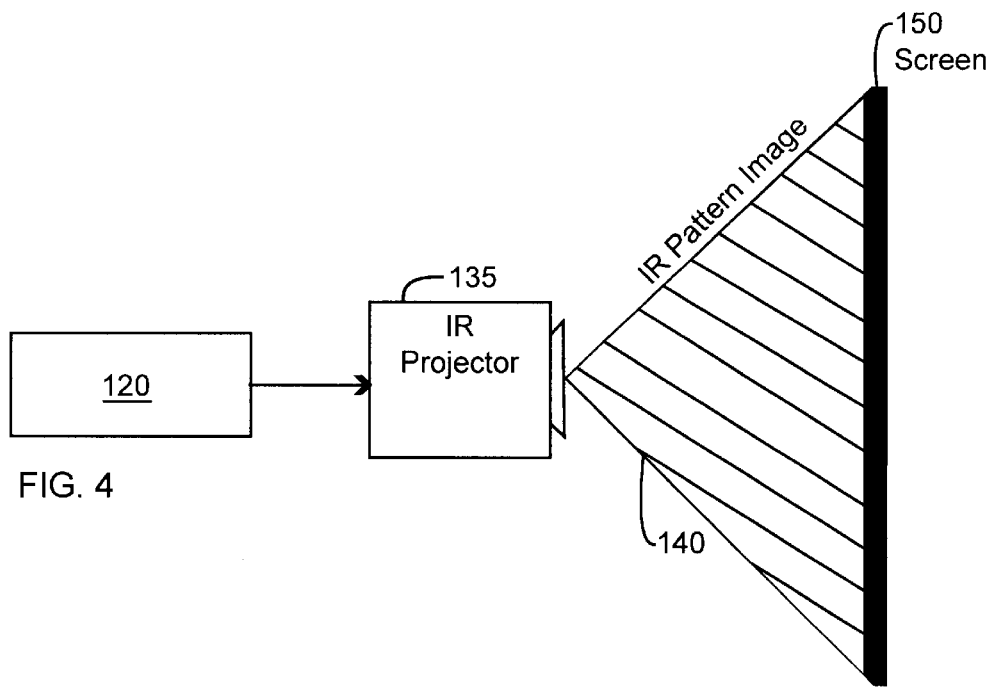
FIG. 4 illustrates a general block diagram of an infrared generator coupled to an infrared projector with an infrared pattern for display onto a screen as an image.

FIG. 4 illustrates an IR pattern image 140 displayed on a screen 150 via a separate IR projector 135 used in conjunction with a conventional projector. The IR pattern is generated such as via generator 120 (of FIG. 3) and is then supplied to the IR projector 135 which displays the IR pattern as an IR pattern image 140.

Figure 5:
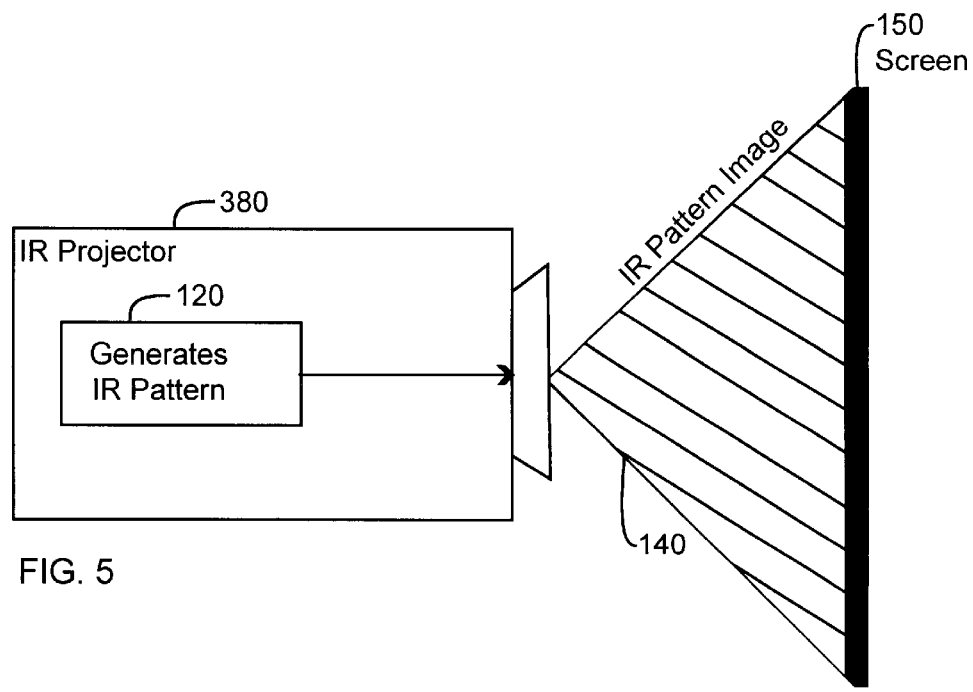
FIG. 5 illustrates a general block diagram of an infrared projector.

Referring to FIG. 5, an IR projector 380 is comprised of an internal generator 120 providing an IR pattern output. IR projector 380 provides for displaying the internally generated IR pattern as an IR pattern image 140 on a screen 150.

Figure 6:
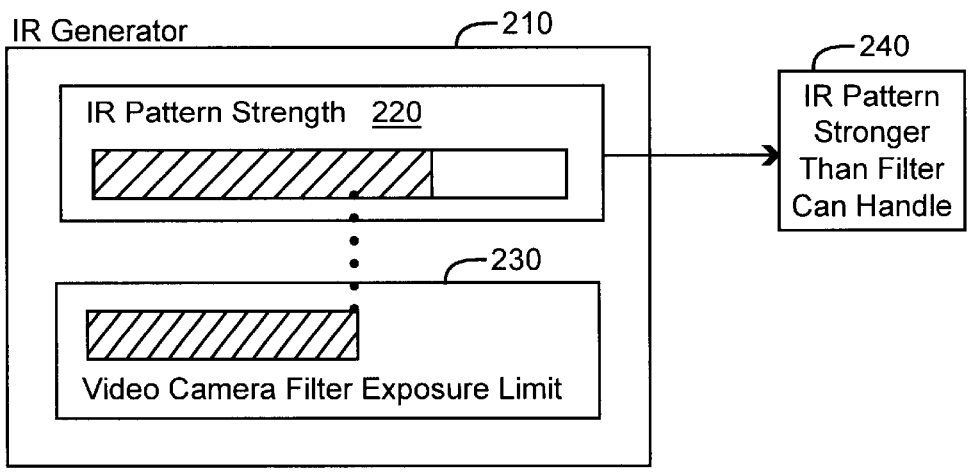
FIG. 6 illustrates a block diagram of an infrared generator capable of generating infrared patterns that are greater in strength than a video camera infrared filter can filter so as to preclude any movie images from being recorded.

FIG. 6 illustrates an IR generator 210 generating an IR pattern 240 of sufficient strength that no video camera IR filter could block the pattern from being recorded. Manufacturers of infrared filters include Tiffen, and camera lens makers. FIG. 6 illustrates the generated IR pattern strength 220 as compared to a typical sample video camera's IR filter exposure limit 230. As shown in FIG. 6, the generated IR pattern strength 220 exceeds the limit of exposure that a video camera can endure with regard to IR emission. The IR generator 210 supplies this IR pattern 240 to an IR projector 250. Types of apparatus that can be used for IR emission include infrared lasers, infrared floodlights, etc., with sufficient strength so that the IR pattern 240 exceeds the limits 230 of the IR filter of a video camera to permit the IR pattern 240 to be recorded, thus, neutralizing (such as over-driving or saturating) the IR filter to not work to block the IR pattern 240 from being recorded. As described above, FIG. 6 represents one embodiment of the present invention illustrating generating an IR pattern of sufficient strength so as to disable the IR filter of a video camera to permit the IR pattern to be recorded and to not work to block the IR pattern from being recorded.

Figure 7:
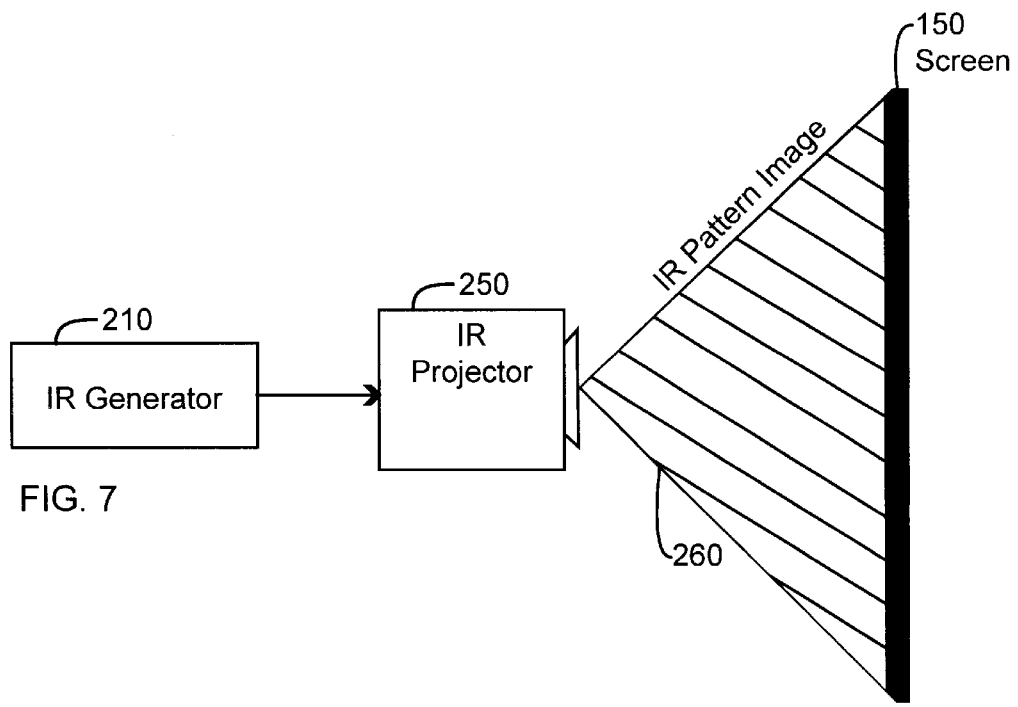
FIG. 7 is a block diagram of an infrared generator coupled to an infrared projector, projecting an infrared pattern to override a video camera filter with the projected infrared pattern to prevent movie images from being recorded.

FIG. 7 illustrates the IR generator 210 generating IR patterns of such strength that the IR pattern 260 exceeds the limits of IR filters on video cameras, and supplying this IR pattern 260 to an IR projector 250. The IR projector 250 projects the pattern image onto the screen 150, superimposing with any other image present on the screen (such as the projected audiovisual (film) image 110 of FIGS. 1A and 2). Projector 250 provides for displaying the IR pattern created by the generator 210 as an IR pattern image 260 of such strength whereby a video camera IR filter could not filter the IR pattern image 260 being displayed on the screen 150 from interfering with recording of the projected audiovisual image 110.

Figure 8:
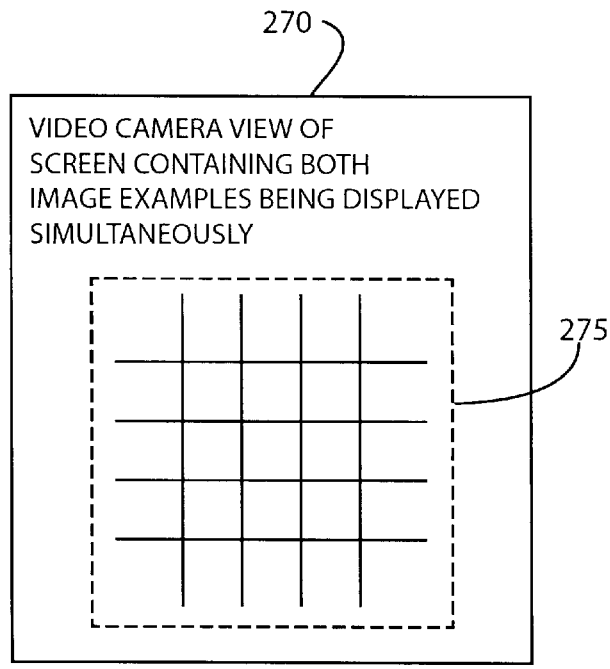
FIG. 8 illustrates one embodiment of a view of what a video camera would see and record when aimed at a screen containing new film images.
Figure 9:
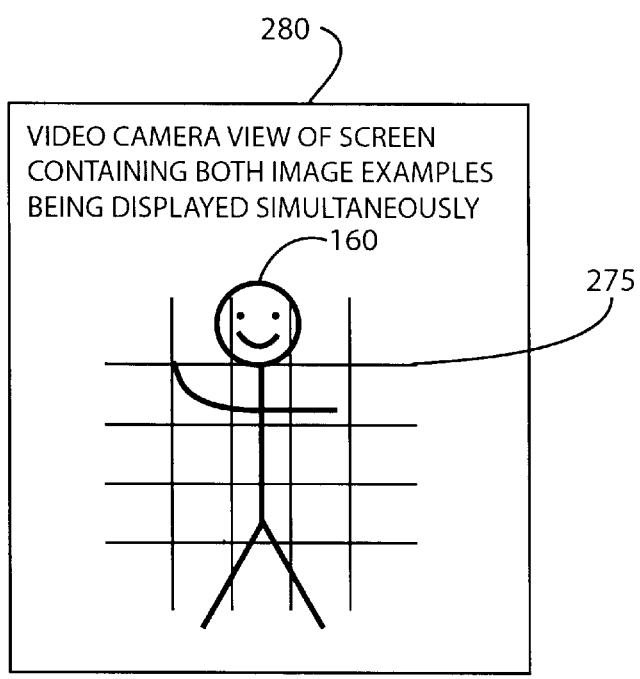
FIG. 9 illustrates a second embodiment of a view of what a video camera would see and record when aimed at a screen containing new film images.

FIGS. 8 and 9 illustrate the resultant views of the video camera recording from using two different strengths of IR patterns as a security means against a video camera's recording of movie film images being displayed on a screen.

FIG. 8 represents one embodiment of the present invention illustrating generating an IR pattern image of sufficient strength, such that the video cameras records the infrared pattern image to obscure the visual presentation image. FIG. 8 illustrates a view 270 of what a video camera sees and records when pointed at a screen displaying the image 160 from FIG. 1B and an IR pattern image 245 (of sufficient strength that exceeds the exposure limit on a video camera) being displayed simultaneously on a screen. The video camera records the IR pattern image 275 because it is of such strength that it exceeds a video camera's IR filter exposure limit so that the IR pattern image 275 is seen by the camera and obscures the visual presentation image 160.

FIG. 9 represents one embodiment of the present invention, illustrating generating an IR pattern image of sufficient strength to just interfere with the recording of the audiovisual presentation signal and not completely eliminate the audiovisual presentation signal from being recorded. FIG. 9 illustrates a view of what a video camera would record if pointed at a screen containing both the audiovisual presentation image 160 (as in FIG. 1B) and a minimal strength IR pattern image of minimally blocking strength being displayed simultaneously on a screen. The IR pattern image 275 of minimal strength is recorded along with the audiovisual presentation image 160 in an interfering manner. In this example, the IR pattern image 275 is of enough strength ("minimal") to interfere with the recording of the audiovisual presentation image 160 by itself, but is not strong enough to completely block the recording by the video camera of the audiovisual presentation image 160.

Figure 10:
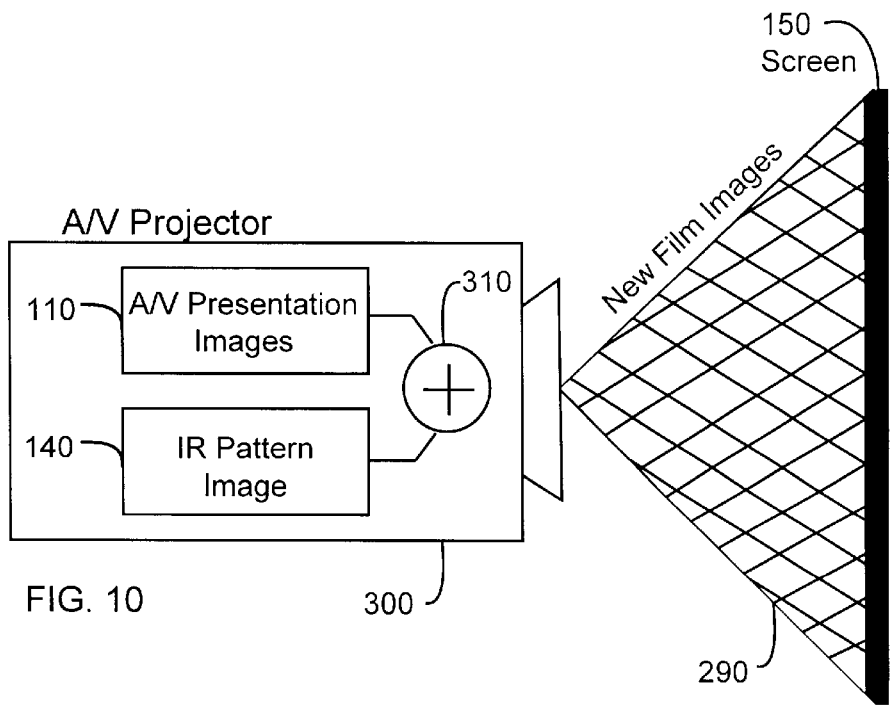
FIG. 10 is a block diagram of one embodiment of the overall system containing an integrated audiovisual presentation projector, in accordance with the present invention, capable of creating and displaying new film images onto a screen.
Figure 11:
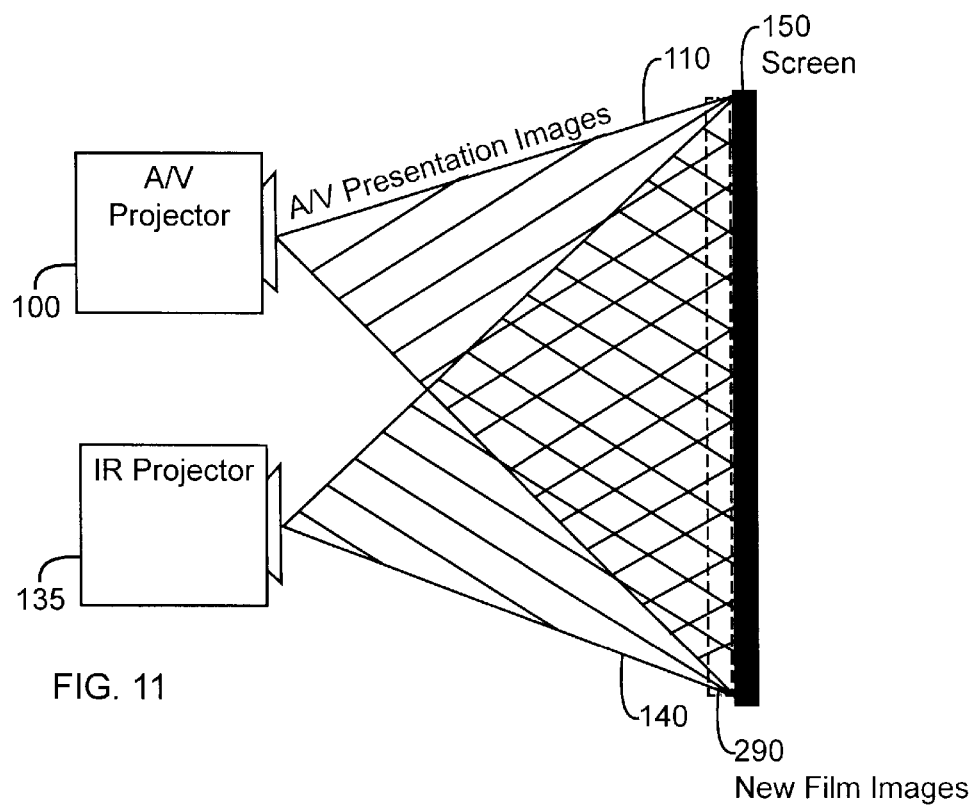
FIG. 11 is a block diagram of a second embodiment of the overall system containing a separate audiovisual presentation projector, in accordance with the present invention, for display of audiovisual presentation images simultaneously with an infrared pattern image being displayed from a separate infrared projector.

FIG. 10 is one example of an embodiment of the present invention illustrating superimposing the IR pattern image with the audiovisual presentation image utilizing just the projector used for displaying the audiovisual presentation image to display new film images. FIG. 11 illustrates an alternate embodiment of the present invention. Referring to FIG. 10, an audiovisual projector 300 provides means 310 for internally superimposing the audiovisual presentation images 110 and the IR pattern image 140 and displaying the superimposed combination as a new combined (film and pattern) image 290 for display on a screen 150.

FIG. 11 illustrates another embodiment of the present invention, illustrating superimposing the IR pattern image with the audiovisual presentation image using one projector for display of the audiovisual presentation image and a second IR projector for displaying the IR pattern image. Referring to FIG. 11, an audiovisual projector 100 provides for displaying (projecting) audiovisual presentation images 110 onto a screen 150. In conjunction therewith, an IR projector 135 provides for projecting IR pattern images 140 on to a screen 150. The result is a superimposed combination of the audiovisual presentation images 110 and the IR pattern image 140 as new combined film images 290 on the screen 150. This embodiment takes advantage of the use of two projectors, a first projector 100 used for the audiovisual presentation images 110 and a second projector 135 used for the projection of the IR pattern image 140. As discussed above with reference to FIG. 3, in the case of image inversion techniques (e.g., project luminance as infrared), the two projectors are synchronized.

Figure 12:
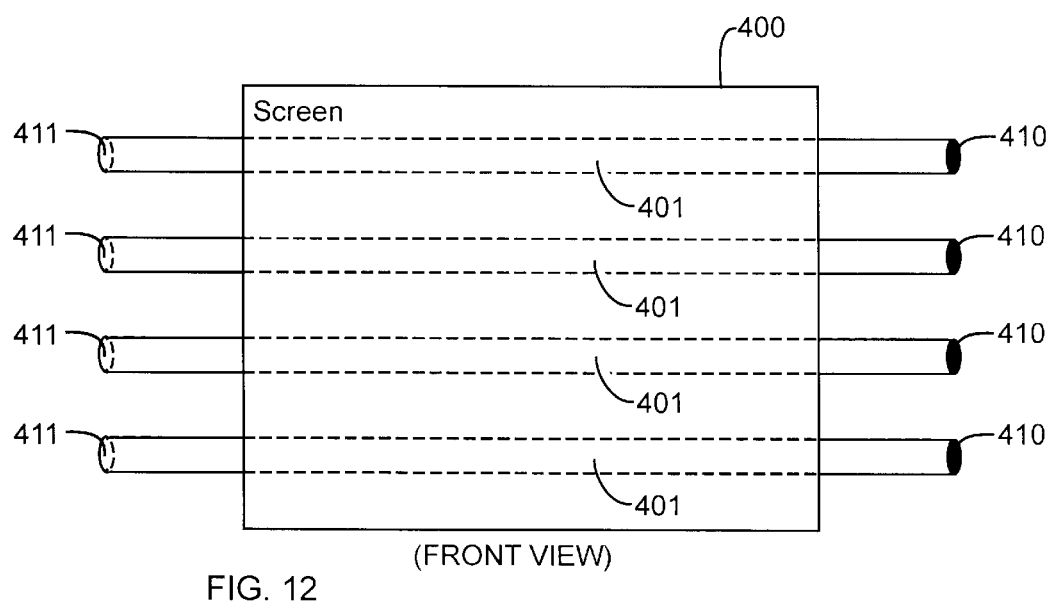
FIG. 12 is a front view of infrared emitters 401 in front of a viewing screen 400.

FIG. 12 illustrates an anti-piracy system to prevent video taping of a projected light image off a screen, the system comprising a viewing area containing the screen facing a direction towards an audience, and a plurality of sources of infrared light beams, adjacent to the screen, emitting infrared light beams in front of the screen parallel to the screen and perpendicular to the direction of the audience watching the screen. Referring to FIG. 12, an alternative embodiment of an anti-piracy system is shown in a front view with a movie screen 400 located behind a plurality of infrared beams 401. The infrared beams 401 are emitted in front of the screen from a first end 411 located to the side of the screen emitting the infrared beam to a second end 410 which receives the infrared beam. These beams form a barrier and block the view for a video camera aimed at the screen trying to record. Various types of infrared beam emitting devices are commercially available. Examples of these include infrared lasers, available commercially for purchase from numerous sources.

Figure 13:
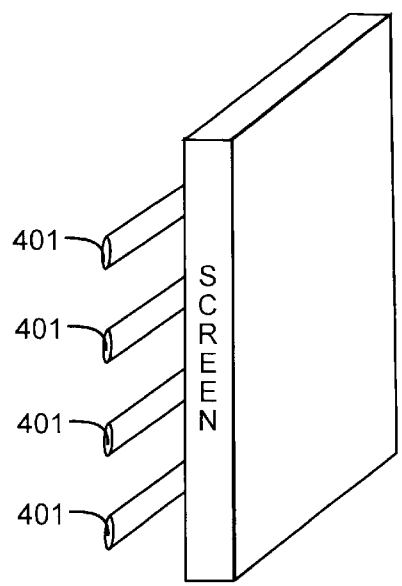
FIG. 13 is a side view of FIG. 12.

Referring to FIG. 13, a side view of the embodiment of the system of FIG. 12 is shown. This side view more clearly illustrates the infrared beams 401 passing in front of the screen on the side from where a viewing audience would be watching. These infrared beams are emitted at a high enough level of power so that they form a barrier to block video cameras from recording the movie images on the screen. As described above, FIG. 13 illustrates the anti-piracy system to prevent video taping of a projected light image off the screen whereby the emitted infrared light beams are of sufficient energy to interfere with a video camera recording the projected movie light image off the screen.

Figure 14:
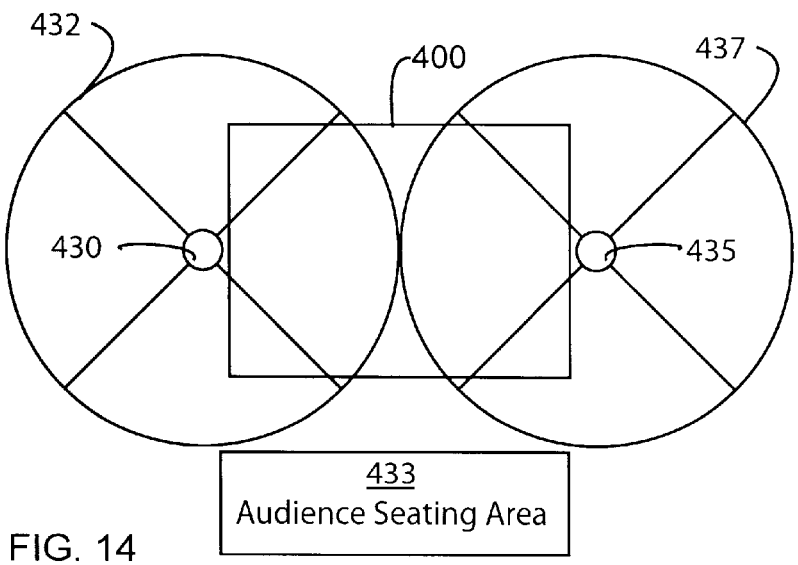
FIG. 14 is an infrared floodlight embodiment, front view.

FIG. 14 illustrates an anti-piracy system to prevent videotaping of a projected light image off a screen, the system comprising an audience area, a viewing area containing the screen facing a direction towards the audience area, and a source of infrared light facing the direction of the audience area. Referring to FIG. 14, a first floodlight 430 is located adjacent to one side of the screen 400 and a second infrared floodlight 435 is located on the other side of the screen 400. The first infrared floodlight emission 432 and the second infrared floodlight emission 437 are in the direction of the audience seating area 433. These infrared emissions prevent a video camera from recording the screen. There are numerous commercially available infrared floodlights.

Figure 15:
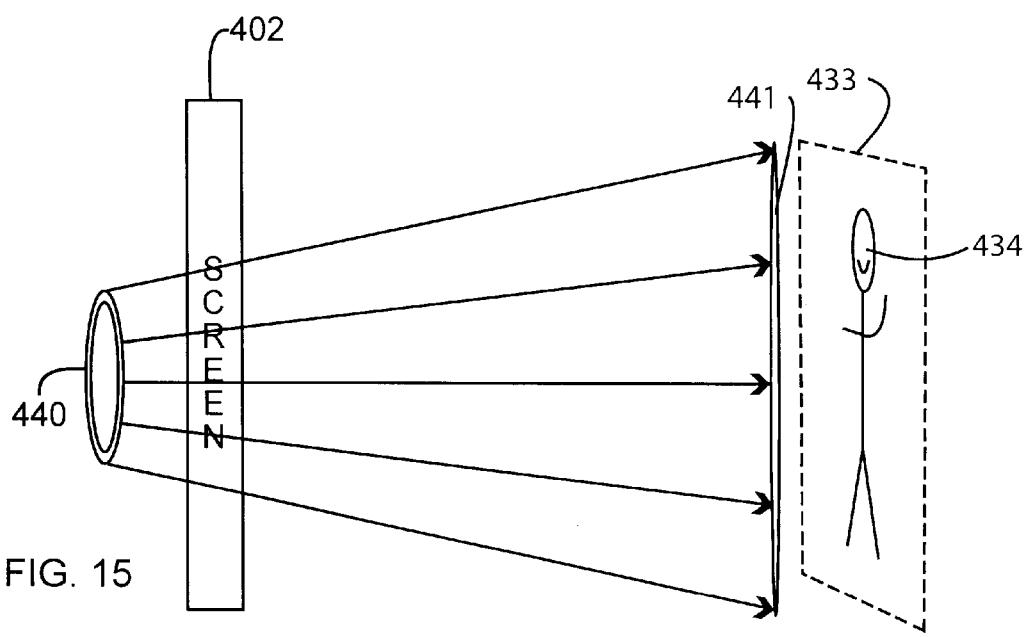
FIG. 15 is a side view of an alternative flood light embodiment.

FIG. 15 illustrates an anti-piracy system to prevent videotaping of a projected light image off a screen, the system comprising an audience area, a viewing area having the screen facing in a direction towards the audience area, and infrared light emitters, adjacent the screen, emitting infrared light in the direction of the audience area. Referring to FIG. 15, another embodiment of the present invention is shown whereby an infrared floodlight 440 is placed behind the screen facing the audience seating area 433 where the audience members 434 are seated. The infrared floodlight emission 441 passes through a screen 402 that is transmissive of infrared light in the direction shown, from back to front. The infrared emission 441 is of such strength that video cameras are unable to record a projected light image (the movie) off the screen 402.

Figure 16:
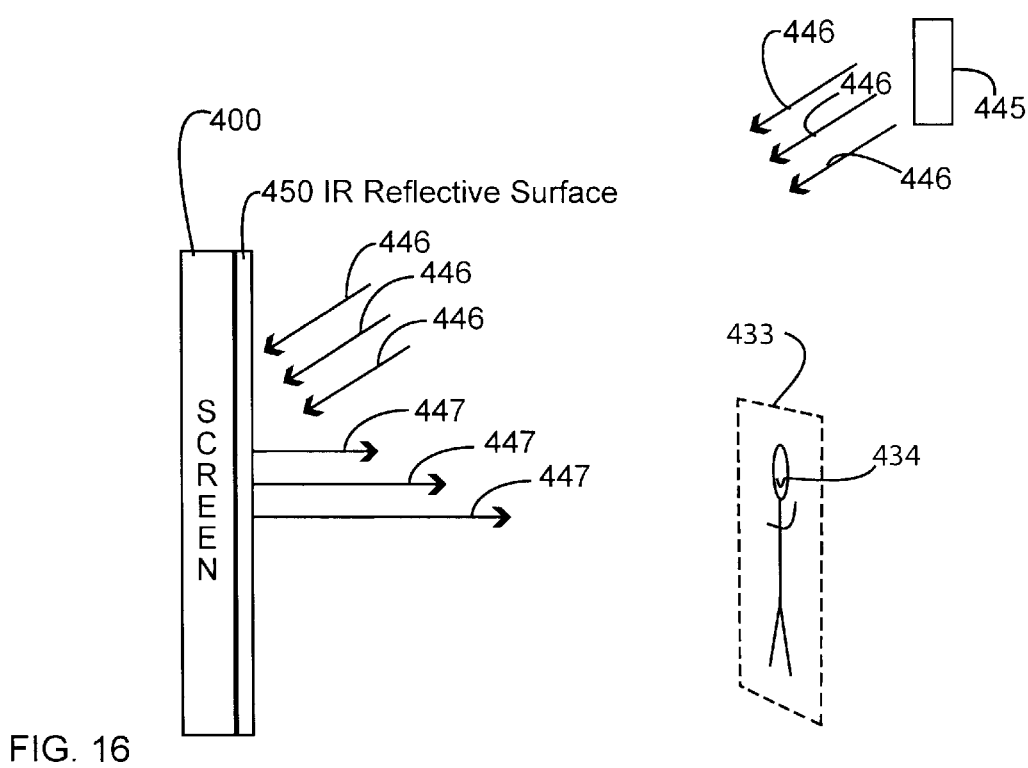
FIG. 16 is a perspective view of an infrared image reflector shielding, around the screen, to reflect infrared light into the seating area of people viewing a projected light image on the screen, illustrated as a plurality of reflectors providing multiple points of infrared light reflection.

FIG. 16 illustrates an embodiment of the present invention, illustrating a system for interfering with unauthorized video camera duplication of a projected visual image, the system comprising a screen in a first area, for reflecting a projected visible light image, a seating area for people to view the projected light image, and a source of infrared light projection into the seating area. Referring to FIG. 16, an embodiment of the present invention is shown whereby an infrared reflective surface 450, that does not interfere with the projection of a light image (e.g., the movie) onto the screen, is placed in front of the screen 400. A source of infrared light 445 located in front of, in, or behind the seating area 433 where the audience members 434 are seated, emits infrared light 446 which reflects off of the infrared reflective surface 450 and is directed into the audience seating area 433 as infrared light emissions 447 that interfere with the video camera recording of the screen 400 and the projected light image without interfering with the human audience's viewing of the movie film.

The infrared light source can comprise one or more flood lights, or a plurality of infrared light sources, point sources (e.g., infrared laser), etc., which are aimed towards the infrared reflective screen. By combination of infrared light sources and infrared reflective surfaces, many types of infrared patterns can be generated reflecting back infrared light at the seating area of sufficient strength to interfere with recording of the projected light image from the movie screen 20 by a video camera. Various types of infrared reflective surfaces, and infrared light sources are commercially available.

Figure 17:
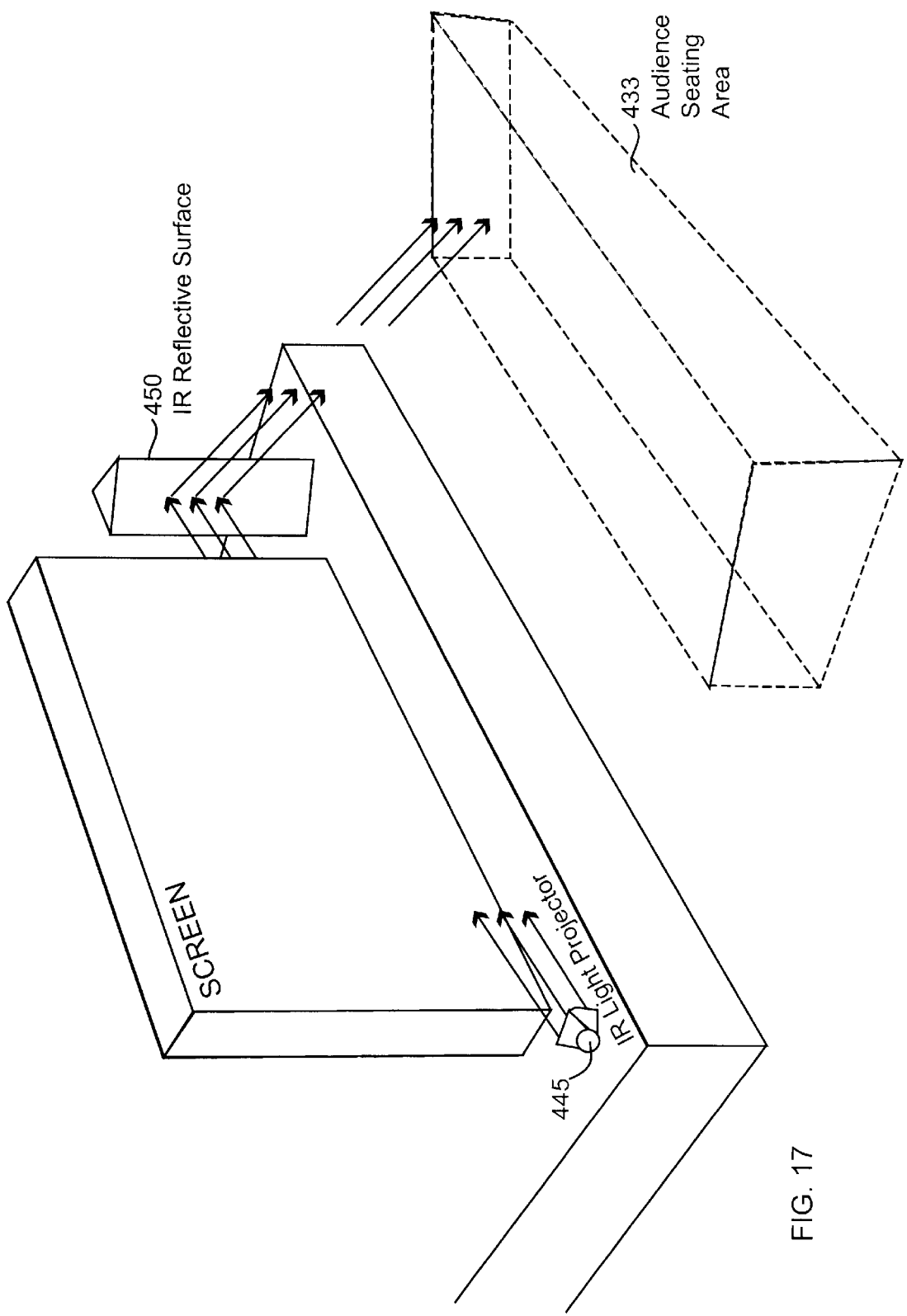
FIG. 17 shows an alternate embodiment of the system of FIG. 16.

FIG. 17 illustrates a system for preventing unauthorized video camera duplication of a projected visual image on a screen wherein the source of infrared light projection (an infrared light projector aimed at infrared light reflective surfaces) is located in the first area, the area containing the movie screen, wherein the infrared light reflective surfaces 450 are also located in the first area. FIG. 17 shows an alternate embodiment of the system of FIG. 16. Referring to FIG. 17, the infrared light projector 445 and the infrared reflective surface(s) 450 are located in front of the audience seating area 433 and in front of the screen 400. In this embodiment, the infrared light projector 455 emits infrared light 446 to the infrared reflective surface 450 whereby it is reflected into the audience seating area 433.

Figure 18:
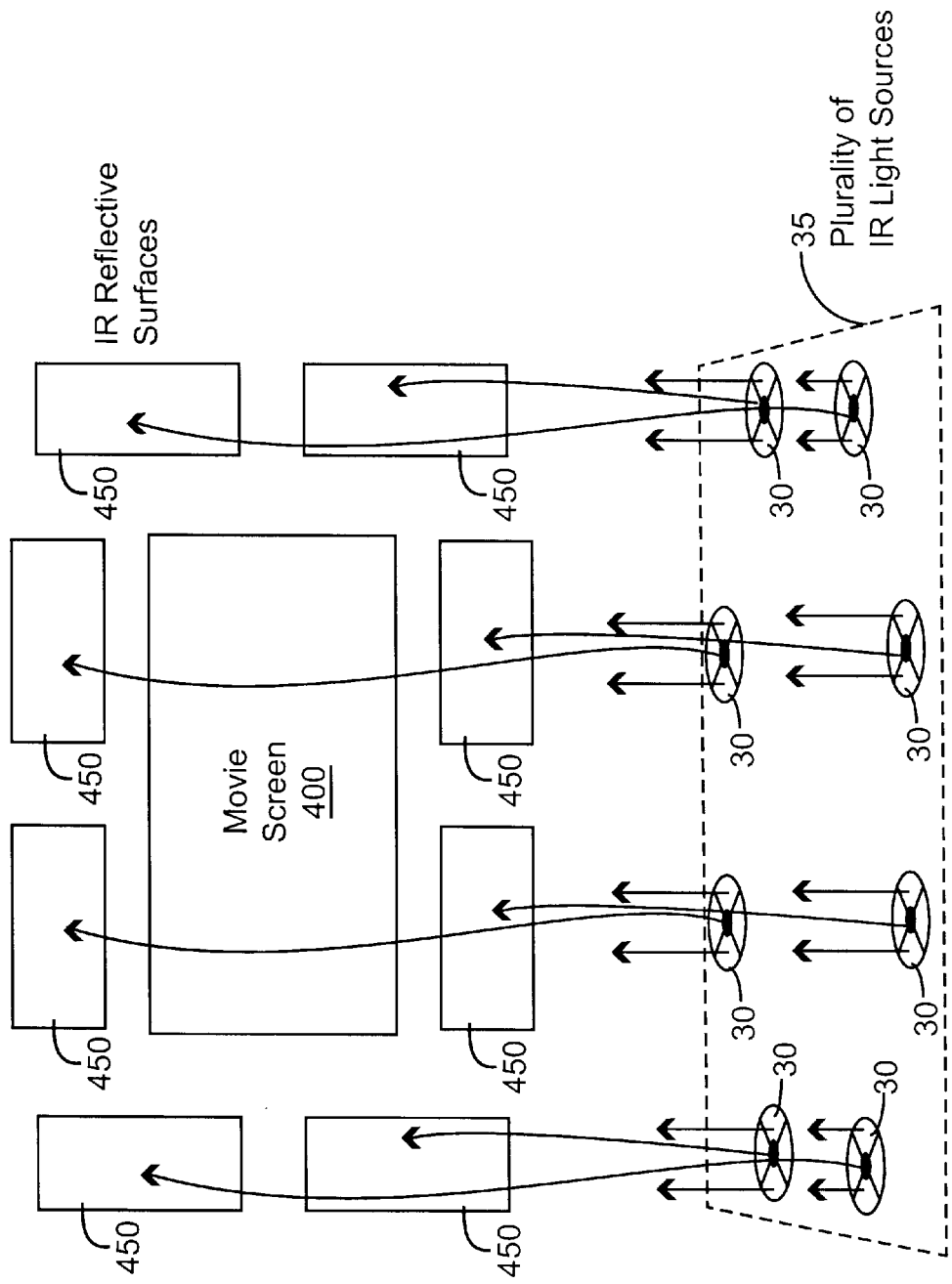
FIG. 18 illustrates an alternate embodiment of the FIG. 17.

FIG. 18 illustrates an alternate embodiment of the FIG. 16. In this embodiment, a plurality of infrared reflective surfaces 450 are located adjacent to the movie screen 400 (such as on the same wall). There is an infrared light source corresponding to and associated with each of the individual infrared reflector surfaces. FIG. 18 illustrates a system and method for providing security against unauthorized video camera capture of a projected light screening by providing a plurality of separate infrared reflective surfaces adjacent to the screen, and a corresponding and associated plurality of infrared light sources each aimed for reflecting infrared light off at least one respective one of the infrared reflective surfaces.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of interfering with video camera having a field of view for recording of a light image, the method comprising:

providing a source of infrared energy sufficient to interfere with the video camera recording; and projecting the infrared energy source towards the video camera field of view so as to interfere with the video camera recording of the light image.

2. The method as in claim 1, further comprising:

generating an visual presentation image on a screen via a projector;

generating an infrared (IR) pattern; and displaying the infrared pattern on the screen as an IR pattern image while simultaneously displaying the visual presentation image on the screen.

3. The method as in claim 2, wherein the simultaneously displaying provides that:

the IR pattern image does not interfere with a human audience viewing of the audiovisual presentation image on the screen, and the IR pattern does interfere with the video camera recording of the movie film images being displayed on the screen.

4. The method as in claim 2, further comprising:

superimposing the audiovisual presentation images with the IR pattern image to create a set of new film images comprised of both the audiovisual presentation images and the IR pattern image.

5. The method as in claim 2, further comprising:

generating an IR pattern within the projector used to display the audiovisual presentation image.

6. The method as in claim 1, wherein the infrared energy source is one of a special infrared reflective screen, an infrared transmissive screen, and a standard movie theater screen.

7. The method as in claim 5, further comprising: displaying the IR pattern image via the projector used to display the audiovisual presentation signal.

8. The method as in claim 2, further comprising:

displaying the IR pattern image using a separate IR projector.

9. The method as in claim 2, further comprising:

generating an IR pattern of sufficient strength so as to disable the IR filter of a video camera to permit the IR pattern to be recorded and to not block the IR pattern from being recorded.

10. The method as in claim 2, further comprising:

displaying an IR pattern image of such strength whereby a video camera's IR filter cannot filter the IR pattern image from being recorded.

11. The method as in claim 9, further comprising: generating an IR pattern image of sufficient strength, such that the video cameras records only the IR pattern image and none of the audiovisual presentation image.

12. The method as in claim 9, further comprising:

generating an IR pattern image of sufficient strength to just interfere with the recording of the audiovisual presentation signal and not completely eliminate the audiovisual presentation signal from being recorded.

13. The method as in claim 2, further comprising:

superimposing the IR pattern image with the audiovisual presentation image utilizing a single projector.

14. The method as in claim 1, further comprising:

superimposing the IR pattern image with the audiovisual presentation image using one projector for display of the audiovisual presentation image and a second IR projector for displaying the IR pattern image.

15. The method as in claim 4, further comprising:

superimposing the IR pattern image with the audiovisual presentation image during the post production stage of creating the movie film images.

16. The method as in claim 4, further comprising:

superimposing the IR pattern image during the process of creation of the movie film images during the filming of the original film images, to create new film images.

17. The method as in claim 1, wherein the method is utilized within a movie theater.

18. The method as in claim 2, wherein the screen is infrared transmissive, the method further comprising:

projecting the infrared pattern from behind the screen.

19. The method as in claim 1, further comprising:

providing security against unauthorized video camera capture of a projected light image screening comprising:

providing a seating area;

providing a first area adjacent to one side of the seating area, the first area containing a screen for reflecting a projected light image of a presentation, the first area further comprising an infrared reflective surface; and providing an infrared light source aimed to provide for reflecting infrared light, off the infrared reflective surface in the first area, towards the seating area.

20. The method as in claim 19, further comprising:

placing the infrared light source behind the seating area, relative to the direction people face when sitting in the seating area to view the screen.

21. The method as in claim 19, further comprising:

providing a plurality of separate infrared reflective surfaces adjacent the screen.

22. The method as in claim 21, further comprising:

providing a plurality of infrared light sources each aimed for reflecting infrared light off at least one of the infrared reflective surfaces.

23. The method as in claim 19, further comprising:

providing a plurality of infrared reflective surfaces, each positioned and angled so as to reflect the infrared light for directing the reflected infrared light towards and into the seating area.

24. The method as in claim 23, wherein the plurality of infrared reflective surfaces are positioned and angled so as to create, by reflection of the infrared light source, a pattern of the infrared light directed at the seating area.

25. The method as in claim 24, wherein the infrared light is of sufficient energy to interfere with and prevent unauthorized recording of the projected image.

26. A system for interfering with video camera having a field of view for recording of a light image, the system comprising:

means for providing a source of infrared energy sufficient to interfere with the video camera recording; and means for projecting the infrared energy source in the field of view of the video camera.

27. The system as in claim 26, further comprising:

a screen in a first area, for reflecting a projection of the light image;

a seating area for people to view the projected light image;

a source for infrared light for projection of the infrared energy source of sufficient strength to interfere with recording by the video camera.

28. The system as in claim 27, wherein the source of infrared light is projected into the seating area.

29. The system as in claim 27, wherein the source of infrared light projection is located in the first area.

30. The system as in claim 27, wherein the infrared light is aimed at infrared light reflective surfaces.

31. The system as in claim 30, wherein the infrared light reflective surfaces are located in the first area.

32. The system as in claim 30, wherein infrared light reflective surfaces reflect infrared light back across and towards the seating area and cover the seating area with an infrared light pattern of sufficient energy to interfere with a video camera recording of the reflected visual image from the screen.

33. The system as in claim 27, wherein the infrared energy source is further comprised of:

infrared light emitters, emitting infrared light of sufficient strength to interfere with the videotaping of the projected light image.

34. The system as in claim 33, wherein the infrared light is emitted in the direction of the seating area.

35. The system as in claim 26, further comprising:

an audience area;

a viewing area containing the screen facing a direction towards the audience area;

a source of infrared light facing the direction towards the audience area.

36. The system as in claim 26, further comprising:

a viewing area containing a screen facing a direction towards an audience;

a plurality of sources of infrared light beams, for emitting infrared light beams towards the direction towards the audience.

37. The system as in claim 36, wherein the plurality of light sources form a pattern in the field of view of the video camera.

38. The system as in claim 37, whereby the emitted infrared light beams are of sufficient energy to interfere with a video camera recording of the light images off the screen.

39. A method of preventing unauthorized recording by a video camera with a field of view for recording, the system comprising:

showing a movie for viewing from an audience area;

projecting infrared light into the audience area so as to be in the field of view of a video camera attempting to record the movie.

40. The method as in claim 39, wherein the infrared light is a pattern.

41. The method as in claim 39, wherein the pattern is at least one of a cross-hatch, a grid, a series of horizontal lines, and a series of perpendicular lines.

* * * * *